US008127991B2

(12) United States Patent
Ross et al.

(10) Patent No.: US 8,127,991 B2
(45) Date of Patent: Mar. 6, 2012

(54) REMOVABLE MEDIA SPINDLE AND ANTENNA ASSEMBLY FOR PRINTER

(75) Inventors: Peter G. Ross, Germantown, WI (US); William D. Tischer, Shoreview, MN (US); Robert F. Behlmer, Wauwatosa, WI (US); Peter G. Scharpf, Hartford, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 1117 days.

(21) Appl. No.: 11/833,714

(22) Filed: Aug. 3, 2007

(65) Prior Publication Data

US 2009/0033581 A1 Feb. 5, 2009

(51) Int. Cl.
*G06K 7/00* (2006.01)

(52) U.S. Cl. ........ 235/439; 235/375; 235/451; 235/487; 235/492; 343/876; 343/893

(58) Field of Classification Search .................. 235/375, 235/439, 451, 487, 492; 343/876, 893
See application file for complete search history.

(56) References Cited

U.S. PATENT DOCUMENTS

| | | | | |
|---|---|---|---|---|
| 6,176,425 | B1 * | 1/2001 | Harrison et al. | 235/385 |
| 6,285,327 | B1 * | 9/2001 | See | 343/702 |
| 6,386,772 | B1 * | 5/2002 | Klinefelter et al. | 400/208 |
| 6,807,380 | B2 * | 10/2004 | Iida et al. | 399/12 |
| 6,963,351 | B2 | 11/2005 | Squires et al. | |
| 2003/0186009 | A1 * | 10/2003 | Odamura et al. | 428/36.9 |
| 2004/0212542 | A1 * | 10/2004 | Rahim | 343/742 |
| 2005/0231583 | A1 | 10/2005 | Maghakian | |
| 2005/0275708 | A1 * | 12/2005 | Squires et al. | 347/214 |
| 2005/0280537 | A1 | 12/2005 | Feltz et al. | |
| 2006/0009075 | A1 * | 1/2006 | Nagata et al. | 439/581 |
| 2006/0187135 | A1 * | 8/2006 | Maniwa et al. | 343/795 |
| 2007/0102513 | A1 | 5/2007 | Scheb | |
| 2007/0152830 | A1 | 7/2007 | Burr | |
| 2007/0152901 | A1 | 7/2007 | Hockey et al. | |
| 2007/0194929 | A1 * | 8/2007 | Wagner et al. | 340/572.7 |

FOREIGN PATENT DOCUMENTS

| | | |
|---|---|---|
| EP | 0979735 A1 | 2/2000 |
| JP | 2005199582 | 7/2005 |

* cited by examiner

*Primary Examiner* — Daniel Hess
*Assistant Examiner* — Ali Sharifzada
(74) *Attorney, Agent, or Firm* — Quarles & Brady LLP

(57) ABSTRACT

A removable spindle for use in a thermal transfer printer houses dual RFID reader antennas that are used to read an RFID tag attached to the core of the print media. The information provided by the RFID tag enables the printer to self-calibrate based on the type of media loaded. The antenna design eliminates "null" areas at which the tag cannot be read, and enables the tag to be read around and across the entire length of the printer spindle. The design also allows the media holder to be easily removed from the printer.

20 Claims, 7 Drawing Sheets

REMOVABLE MEDIA SPINDLE AND ANTENNA ASSEMBLY FOR PRINTER

CROSS-REFERENCE TO RELATED APPLICATION

Not applicable.

FIELD OF THE INVENTION

The field of the present invention is printer systems, and more particularly antenna systems for use in a auto-configurable printer.

BACKGROUND

The set up and calibration of thermal transfer printers can be both cumbersome and expensive. In most thermal transfer printers, full calibration requires feeding several feet of label stock and ribbon material. This calibration process must be performed each time a different type of media is loaded into the printer. The set up and calibration process can be avoided if the printer can discern what type of media is loaded.

To simplify printer set-up, various methods have been used to identify the media loaded into a thermal transfer printer, including touch cell memory components and barcodes. In these applications, a code or memory component including media identification data is coupled to the media provided in the printer. The data is read when the media is positioned in the printer, and the printer is configured for the appropriate media.

One method that is particularly well-suited for identifying media in a thermal transfer printer is radiofrequency identification or RFID technology. Unlike barcode or touch cell memory applications, RFID does not require either a line of sight or a direct connection to the identifying code or memory component to acquire data about the media loaded into the printer.

Antenna systems used in these types of printers for reading the data from the RFID tags, however, typically comprise a single horizontal coil or loop antenna housed in the media spindle of the printer. When the RFID transponder travels around the circumference of such an antenna, there are null areas at which the RFID reader cannot download information from the RFID transponder associated with the tag. These null areas occur when the RFID tags are perpendicular to the plane of the antenna, and, although the width of the null areas can be varied, they can never be eliminated. These nulls create problems if the printer attempts to gather information from the RFID transponder while the transponder is located in a null. This problem is particularly troublesome when the media is initially loaded into the printer, and when it is important to verify the type of media inserted into the printer.

The present invention addresses these problems.

SUMMARY OF THE INVENTION

In one aspect, the present invention provides an antenna system for use in a printer system. In this antenna configuration, two coil or loop antennas are located in a media spindle of a printer. A controller in the printer switches the RFID reader between two antennas when it fails to receive a signal from the antenna that is being polled. When the RFID transponder is located in a null area for one antenna, for example, the reader will switch to the opposing antenna, which will be in an optimum orientation relative to the transponder. Whenever the RFID transponder is located in a null of one reader antenna, the opposing antenna will always be in an optimum orientation. The control system therefore compensates for nulls and allows the reader to successfully download information from and upload information to the transponder in any position along or around the circumference of the printer media spindle.

The antenna system of the present invention, moreover, is easily positioned in and removed from the printer. In one embodiment, the media spindle utilizes spring-loaded contact pins which are mounted on printed circuit boards coupled to the antennas in the antenna system. These circuit boards are connected to the antenna circuit boards via coaxial cable, and the resulting antenna assembly is located within the media holder housing.

When the media holder assembly is installed into the printer housing, the spring pins or contacts can make electrical connection with corresponding round, flat button contacts in the receptacle for the media holder in the printer housing, with the loading of the springs inside the media holder contact pins providing consistent electrical contact. To ensure long life for the spring contact pins, and to prevent forces acting on the pins in directions other than that of spring actuation, the media holder housing is designed to fit very closely into the receptacles in the printer housing. The close fit prevents lateral movement of the contact pins along the surface of the contact buttons. Furthermore, the spring contact pins are located below flush in the media holder housing. Therefore, when the media holder is not installed into the printer, the pins are protected from damage by the media holder housing.

In another aspect of the invention, a printer is provided with an RF transceiver and an antenna assembly sized and dimensioned to be received in the interior of a core of a roll of media including at least one RFID tag. The antenna assembly comprises a first antenna and a second antenna, and the first antenna is positioned with respect to the second antenna to allow the RF transceiver to acquire data from the RFID tag from the other of the first and second antennas when a selected one of the first and second antennas is in a null area for data communications from the RFID tag. A controller is connected to the RF transceiver, and is programmed to switch between the first and second antennas to avoid the null area.

In yet another aspect of the invention, a printer includes a housing, a printer circuit, and a removable spindle. The housing includes a receptacle, and the printer circuit is positioned in the housing, and includes an RF transceiver coupled to the receptacle through a switch. The removable spindle includes an antenna assembly comprising a first and a second antenna to provide a communication link to the RF transceiver, and an antenna connector that is receivable in the receptacle for connection to the printer circuit. The printer circuit further includes a controller for selectively coupling the RF transceiver to one of the first and second antennas to allow the printer circuit to communicate to an RFID tag on a roll of media provided on the removable spindle.

In still another aspect of the invention, a spindle for retaining a roll of media in a printer is provided. The spindle includes a first and a second planar antenna, in which the second planar antenna is positioned with respect to the first planar antenna to provide communications to an RF transceiver in the printer when the first planar antenna is in a null area.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENTS

Figure 1:
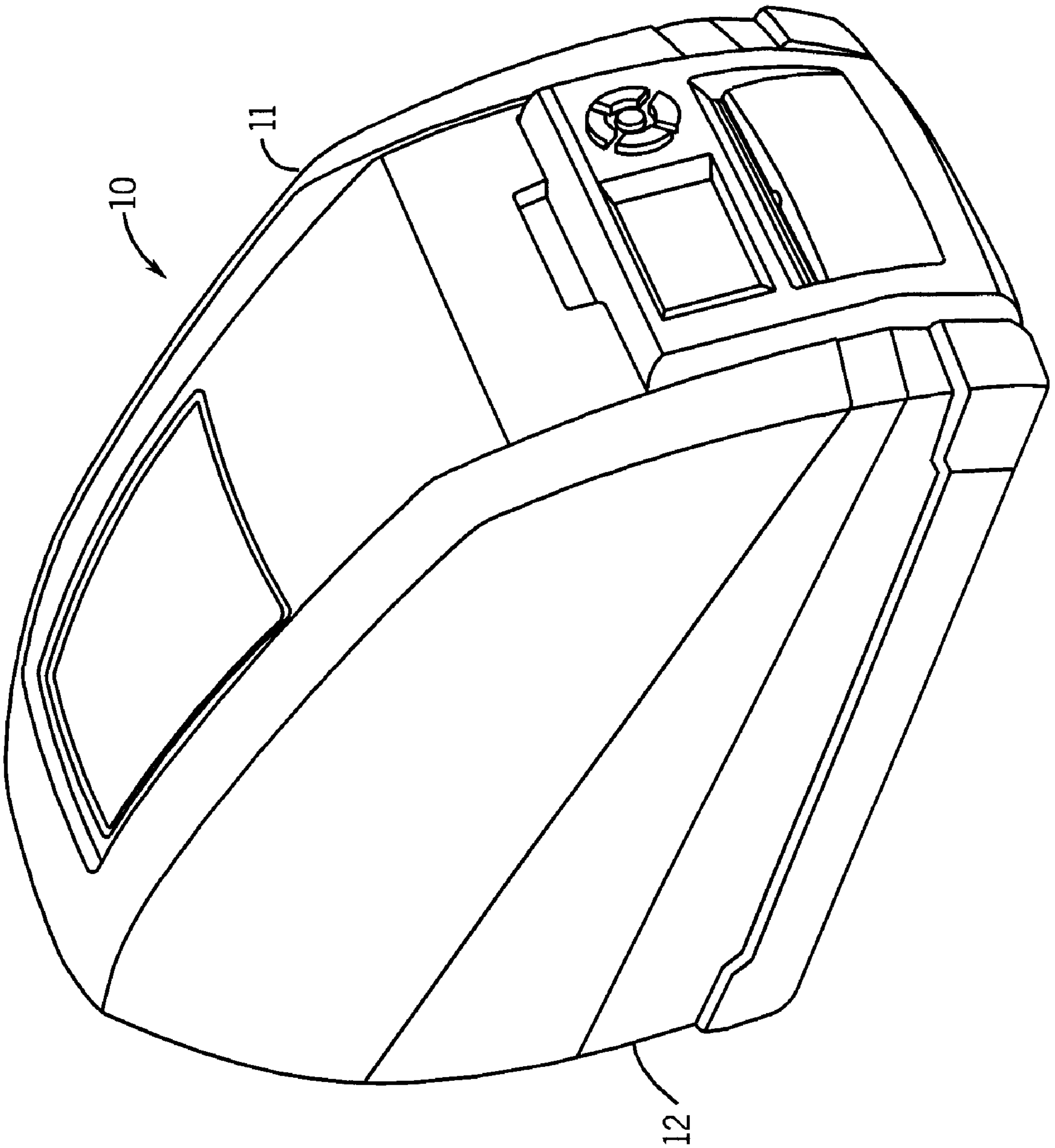
FIG. 1 is a perspective view of a printer constructed in accordance with the present invention.
Figure 2:
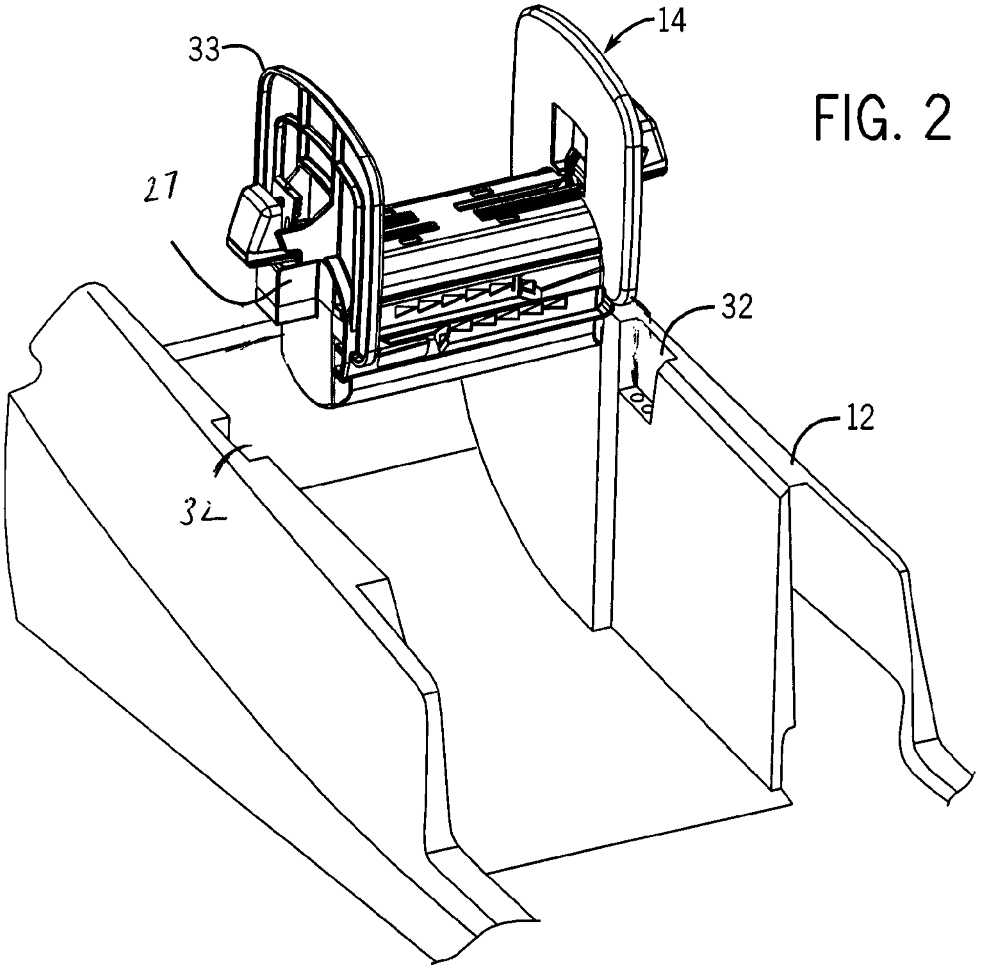
FIG. 2 is an exploded view of the printer housing base of the printer of FIG. 1 and an associated media holder assembly.

Referring now to the figures and more particularly to FIG. 1, a printer 10 including a printer housing 11 having a printer housing base 12 is shown. Referring now also to FIG. 2, the printer housing base 12 is sized and dimensioned to receive a print head (not shown) and associated circuitry for printing information, such as text, on a media provided in a media holder assembly 14.

Referring still to FIG. 2, the printer housing base 12 includes media holder receptacles 32 which are formed as depressions in on opposing sides of the printer housing base 12, and which are sized and dimensioned to receive a media holder plug 27 provided in the media holder assembly 14. The interconnection between the plug 27 and receptacle 32 provides an electrical connection between the media holder assembly 14 and printer housing 12 as described more fully below.

Figure 3:
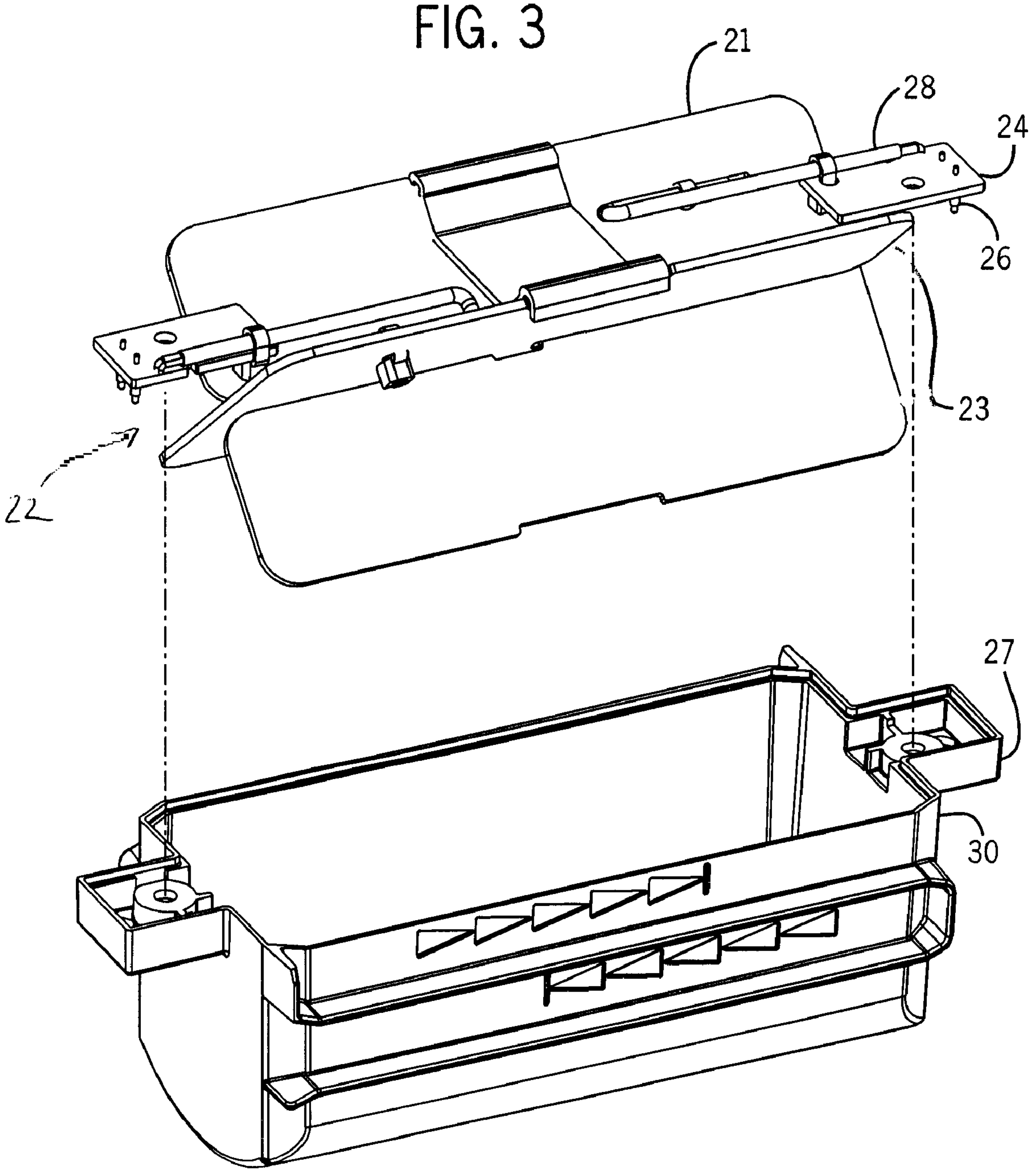
FIG. 3 is an exploded view of the media holder assembly of FIG. 2, illustrating a media base and antenna assembly.
Figure 4:
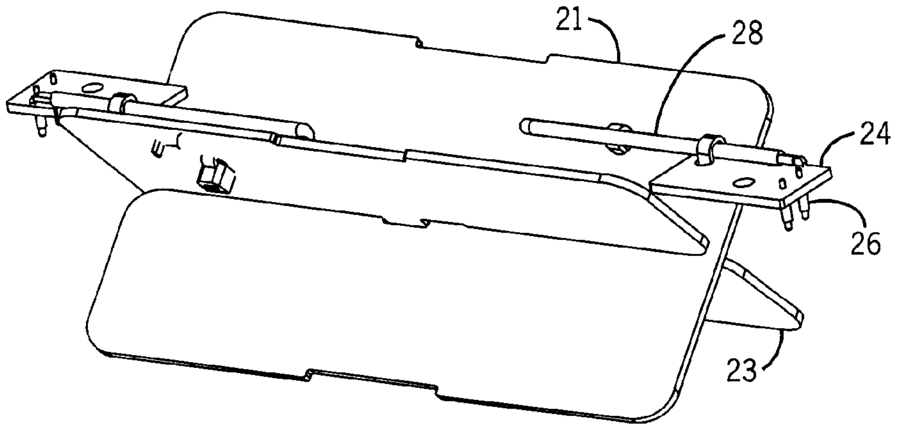
FIG. 4 is a perspective view of the antenna assembly of FIG. 3.
Figure 10:
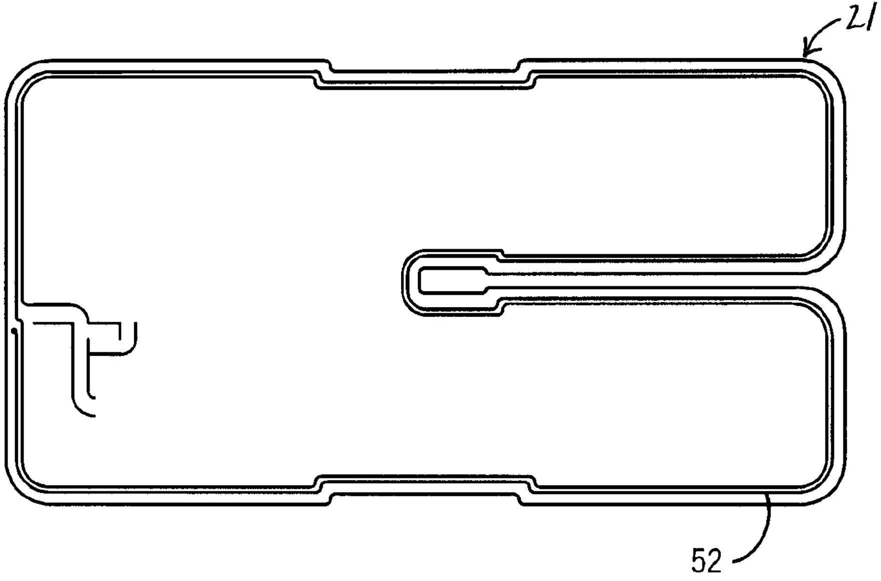
FIG. 10 is a top view of a printed circuit board illustrating the traces that form each of the loop media antennas.

Referring now to FIG. 3, an exploded view of the media holder assembly 14 is shown. The media holder assembly 14 includes a media holder base 30, which includes media holder plugs 27 extending from opposing sides. The media holder base 30 is sized and dimensioned to receive an antenna assembly 22 which, referring now also to FIG. 4, includes a first antenna 21 and a second antenna 23 which, as shown here, can be substantially planar in construction. Referring now also to FIG. 10, each of the antennas 21 and 23 is preferably constructed on a printed circuit board that includes a trace 52 that extends around the perimeter of the printed circuit board, forming a loop. As shown, the antennas 21 and 23 are substantially orthogonal to one another, that is, the antennas are positioned substantially 90 degrees apart. However, the antenna assembly 22 can include two or more antennas that are positioned with respect to one another to allow the antennas to be electrically switched to compensate for nulls encountered by any one of the antennas in the antenna assembly 22, as described below. The antennas, therefore, can be varied in number and provided at different angles, depending on the width of the null area, and other factors.

Referring still to FIGS. 3 and 10, each of the antennas 21 and 23 further includes a printed circuit board 24 mounted to the antenna printed circuit board, and that includes contact pins 26 that are connected to the loop 52 of the corresponding antenna 21 or 23. A coaxial cable 28 connects the antenna printed circuit board 21 or 23 to the contact pins 26. The contact pins 26 are preferably spring-loaded contacts, which provide a good electrical connection to receptacle 32, as discussed below. Although pins are described here, the antenna connector can also be sockets or other types of connectors.

Figure 5:
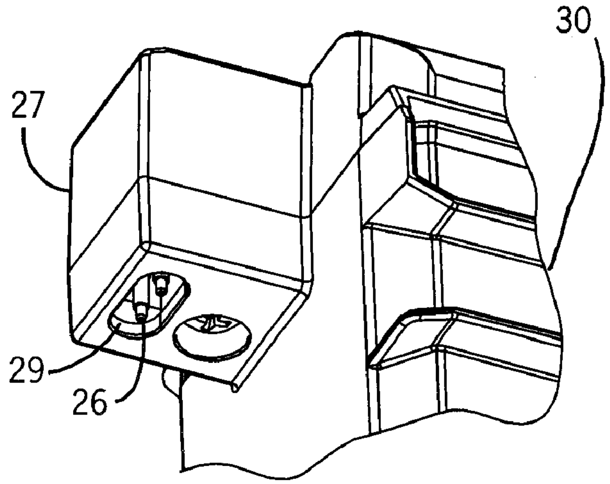
FIG. 5 is a bottom view of the media base of FIG. 3, illustrating a plug for coupling the media assembly to the printer housing.

Referring now to FIG. 5, the media holder plugs 27 formed in the media holder base 30 include depressions provided in a bottom surface of the plugs 27. The depressions 27 are sized and dimensioned to receive the contact pins 26. As received in the plug 27, the contact pins 26 rest in the depression 29 formed in the bottom surface of the plug 27, and do not protrude from the media holder 14. The depression 29 therefore protects the contact pins 26 from being bent in directions other than that of spring actuation, preventing bending, tearing, shearing, or other damage to the contact pins 26.

Figure 6:
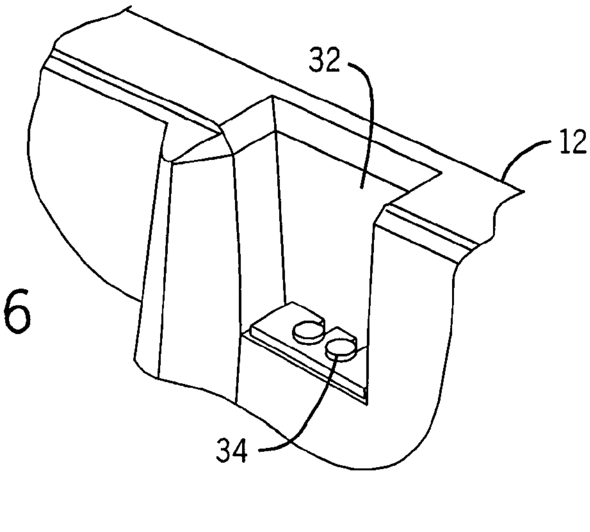
FIG. 6 is a partial view of the printer housing base of FIG. 2, illustrating a receptacle for mating with the plug of FIG. 5.

Referring now also to FIG. 6, as discussed above, the printer housing 12 includes a media holder receptacle 32 that houses electrical connectors for interconnection with the plug 27. As shown here, the connectors can be button contacts 34, which are round and flat and therefore provide a consistent electrical connection between the contact pins 26 and the button contacts 34, particularly where the contact pins 26 are spring-loaded contacts. Depending on the construction of the contact pins 26, however, various types of connectors can be provided in the receptacle 32, including pins, sockets, or other connectors. Furthermore, the orientation of the plug 27 and receptacle 32 can be reversed, and various other modifications made to the interconnection between the media holder base 30 and housing 12.

Figure 7:
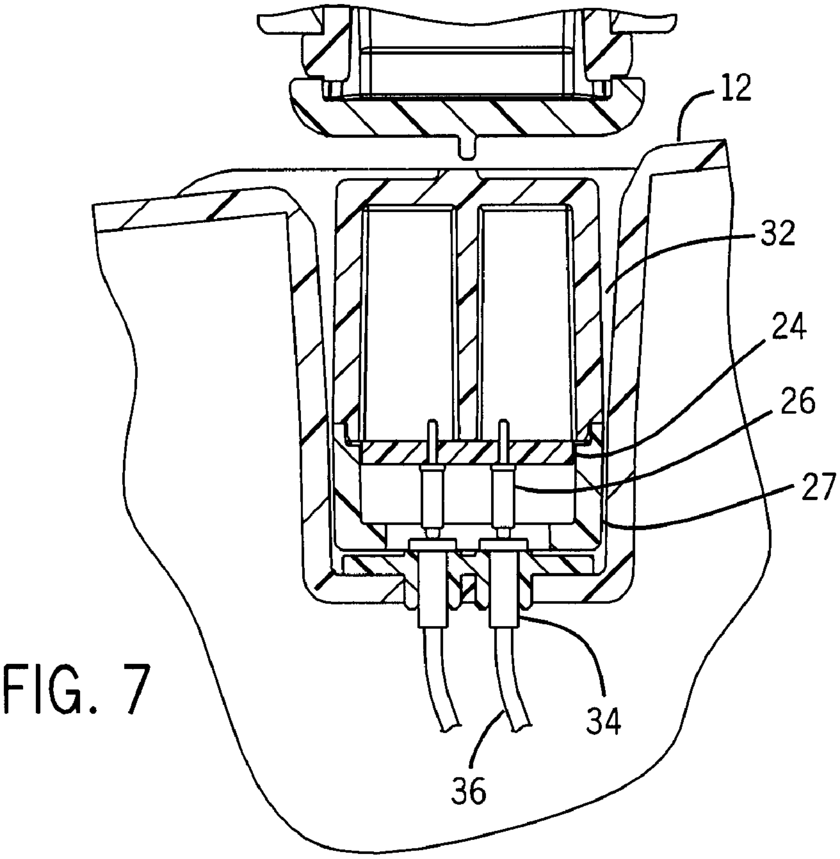
FIG. 7 is a cutaway side view of the plug of FIG. 5 as received in the receptacle of FIG. 6.

Referring now also to FIG. 7, a cutaway view of the media holder 14 as received in the printer housing 12 is shown, illustrating particularly the interconnection between the receptacle 32 and plug 27. As shown here, the plug 27 is received in the receptacle 32 in a tight, interference fit. When the plug 27 is inserted into the receptacle 32, the contacts pins 26 are aligned with and rest on the button contacts or pads 34. As described above, the contact pins 26 are preferably spring loaded and therefore provides a good electrical connection to the button contacts or pads 34. The contact pins 26 are connected directly to the spring contact PC board 24 which, as described above, is connected to an antenna 21 or 23. A coaxial cable 36 connects the button contacts 34 to internal printer circuitry, described below with reference to FIG. 9.

Figure 9:
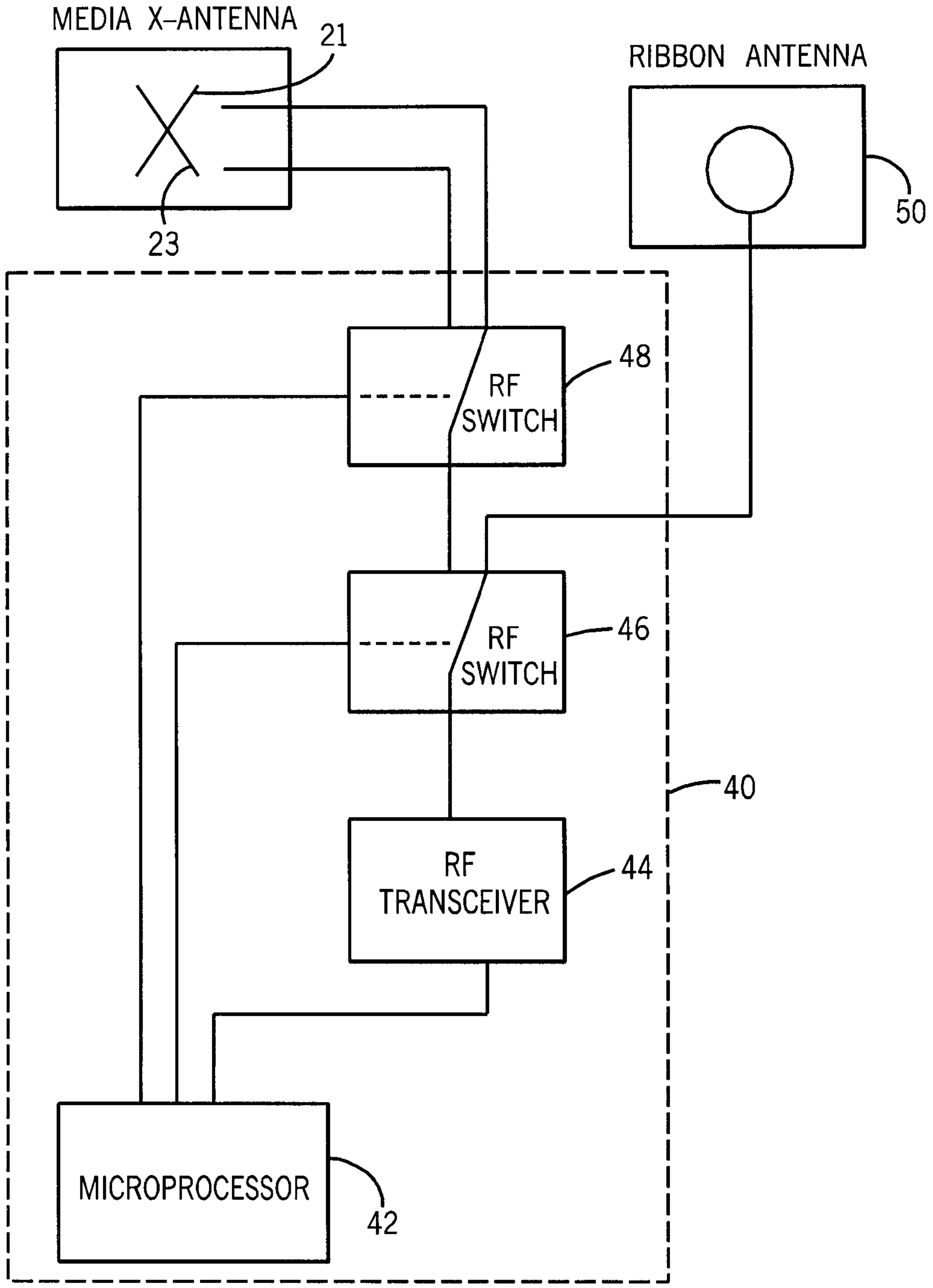
FIG. 9 is a block diagram of a control system for a printer constructed in accordance with the invention.

Referring now to FIG. 9, a block diagram of a printer circuit for use in a printer employing the present invention is shown. The printer includes a printer control circuit 40 which, as described above, can control communications between RFID tags as provided on a roll of media and on a ribbon inserted into the printer. The printer control circuit 40 includes a microprocessor 42 or other controller element, an RF transceiver 44 for communicating with RFID tags and transponders, and one or more RF switches 46 and 48, for switching between antennas. The printer control circuit 40 can also control a print head (not shown) to drive the print head to print on the printer media, although a separate circuit can also be provided for this function.

Figure 8:
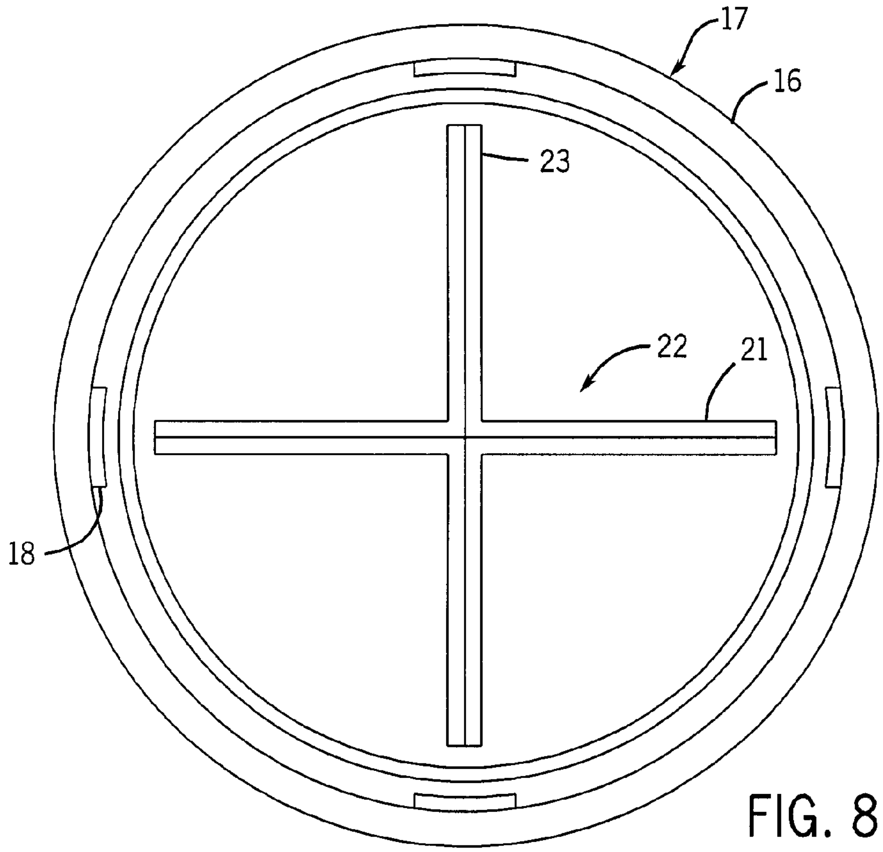
FIG. 8 is a cutaway view of a roll of media receiving an antenna assembly.

Referring still to FIG. 9, in operation, the control circuit 40 is programmed to select between antennas 21 and 23 through RF switch 48 based on whether data can be received from the selected antenna. The output of the media antenna is fed through switch 48 to an RF transceiver 44 which provides information acquired from the RFID tags or transponders associated with the media antennas 21 and 23 to the microprocessor 42. Referring now to FIG. 8, the cutaway side view of the media roll as positioned on the antenna assembly 22 is shown. To provide data to the printer, an RFID transponder 18 is coupled to the interior of a media core 16 associated with the media. The transponder 18 includes a memory component which stores data indicating the type of media that is provided on the core 16. This information can include, for example label material type, height and width of printable area, label color, correlating acceptable ribbons, etc.

Figure 11:
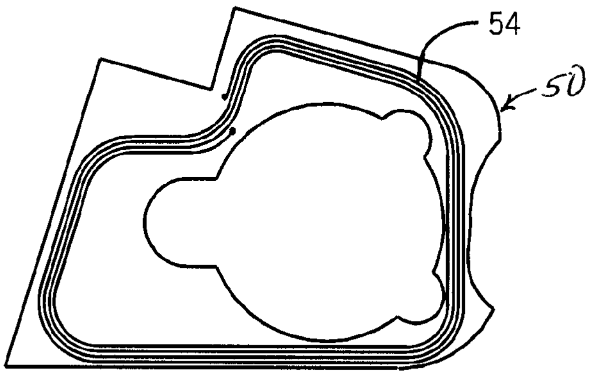
FIG. 11 is a top view of a printed circuit board illustrating traces that form a ribbon antenna that can be used in the present invention.

Referring again to FIG. 9, optionally, a second antenna 50 can be provided to read from and write to an RFID tag or transponder associated with the ribbon inserted into the printer prior to a printing process. The ribbon antenna 50 is connected to the microprocessor 42 selectively through the RF switch 46 which, as shown, is also controlled by the microprocessor 42 to select input from one of the media antennas 21 or 23 or the ribbon antenna 50. Referring now also to FIG. 11, the ribbon antenna 50 is provided on a circuit board, which includes a trace 54 in the form of a loop or coil.

Referring now to FIG. 8, in operation, a roll of printer media 17 is positioned on the media holder assembly 14. The roll of media 17 includes a media core 16 to which an RFID tag or transponder 18 is coupled. The RFID transponder 18 stores data about the type of media that is being positioned in the printer 10. The roll of media 17 is positioned over the spindle or antenna assembly 22, such that the antennas 21 and 23 are substantially centered in the media core 16. When the media 17 is properly positioned, the media holder assembly 14 is plugged into the receptacles 32 in the printer housing 12, providing a connection between the contact pins 26 and contact buttons 34, as shown in FIG. 7.

Referring again to FIG. 8 and also to FIG. 9, null areas, where a corresponding antenna cannot access an RFID tag 18, are located directly above the wires or traces that form the coil antennas 21 and 23 on the printed circuit boards that form antennas 21 and 23, and can prevent the printer circuit 40 from reading the data from the RFID transponder 18 when the transponder 18 is located at a null, which can be particularly troublesome when the media is initially loaded into the printer. To allow the RFID transponder 18 to be read irrespective of its position, the printer control circuit 40, and particularly microprocessor 42, selectively activates the RF transceiver 44 to acquire data from the RF tag 18, and activates switch 48 to query the RFID tag 18 via either antenna 21 or antenna 23. The microprocessor switches antennas if it cannot read data from the RFID tag 18 using the connected antenna 21 or 23, which provides an indication that the RFID tag 18 is in a null area. As described above, the microprocessor 42 can also selectively switch antenna 50 into the print control circuit 40 to read data associated with an RFID tag associated with the ribbon, which can then be used to determine operating characteristics for the printer, or to assure a match between the print media and ribbon.

It should be understood that the methods and apparatuses described above are only exemplary and do not limit the scope of the invention, and that various modifications could be made by those skilled in the art that would fall under the scope of the invention. For example, although specific types of connectors are described above for coupling the antenna system to the printer, it will be apparent that various other types of known plug and receptacle elements can be used, and various types of electrical contacts can also be used. Additionally, although the invention is described above as including two antennas that are substantially orthogonal, it will be apparent that more than two antennas could be used. Furthermore, these antennas could be arranged with respect to one another in a number of ways to allow for reading of data when the RFID tag is in a null area associated with any one antenna. Additionally, although the invention is described above specifically with reference to a thermal transfer printer, the present invention can be used in various types of printers and other types of equipment where rolls are used in conjunction with RFID transponders or tags.

To apprise the public of the scope of this invention, the following claims are made:

1. A printer, comprising:

an RF transceiver;

an antenna assembly sized and dimensioned to be received in the interior of a core of a roll of media including at least one RFID tag, the antenna assembly comprising a first antenna and a second antenna, wherein the first antenna is positioned with respect to the second antenna to allow the transceiver to acquire data from the RFID tag from the other of the first and second antennas when a selected one of the first and second antennas is in a null area for data communications from the RFID tag; and a controller connected to the RF transceiver, the controller being programmed to switch between the first and second antennas to avoid the null area.

2. The printer as recited in claim 1, further comprising a printer housing including a controller connector for coupling each of the first and second antennas to the controller.

3. The printer as recited in claim 1, wherein the antenna assembly comprises an antenna connector for coupling the first and second antennas to the controller.

4. The printer as recited in claim 3, wherein the antenna connector comprises a spring loaded contact.

5. The printer as recited in claim 1, further comprising a controller connector for connecting the controller to the antenna assembly.

6. The printer as recited in claim 5, wherein the controller connector is a button contact.

7. The printer as recited in claim 3, wherein the antenna connector comprises a first printed circuit board connected to the first antenna and to a first spring contact and a second printed circuit board connected to the second antenna and to a second spring contact.

8. The printer as recited in claim 2, further comprising a media holder assembly sized and dimensioned to receive the roll of media and the antenna assembly.

9. The printer as recited in claim 8, wherein the housing includes a media holder receptacle including the controller connector, and the media holder assembly includes a mating media holder plug comprising an antenna connector coupled to the antenna assembly, wherein when the media holder plug is received in the media holder receptacle, the antenna connector is coupled to the controller connector.

10. The printer as recited in claim 8, wherein the roll of media and the antenna assembly are received in the media holder assembly received in the printer housing.

11. The printer as recited in claim 1, further comprising a switching element, the switching element being connected between the antenna assembly and the controller, the controller being programmed to selectively activate the switching element to connect at least one of the first antenna and the second antenna to the RF transceiver.

12. The printer as recited in claim 11, further comprising a second switching element, the second switching element being selectively coupled by the controller to a ribbon antenna, the ribbon antenna being positioned in the printer housing to acquire data from a second RFID tag coupled to a ribbon.

13. The printer as recited in claim 1, wherein the first and second antennas are positioned substantially orthogonal to one another.

14. The printer as recited in claim 1, wherein the antenna assembly comprises an antenna connector that is selectively coupled to and removable from a controller connector, wherein the antenna assembly is removable from the printer.

15. The printer as recited in claim 9, wherein the antenna connector in the media holder plug comprises at least one of a spring loaded contact pin and a button contact, and the controller connector in the media holder receptacle comprises the other of a spring loaded contact pin and a button contact.

16. The printer of claim 1, wherein the antenna assembly is coupled to a media holder including a media holder plug sized and dimensioned to be received in a corresponding media holder receptacle coupled to the controller in the printer, and the media holder plug includes an antenna connector coupled to the antenna and the media holder receptacle comprises a controller connector coupled to the controller, wherein when the antenna connector is received in the media holder receptacle, the antenna is coupled to the controller.

17. The printer of claim 16, wherein the media holder plug comprises a depression, and the antenna connector includes at least one pin that is retained in the depression to prevent damage to the pin.

18. The printer of claim 1, wherein the first antenna comprises a first planar antenna, and the second antenna comprises a second planar antenna.

19. The printer as recited in claim 18, wherein the first and second antennas each comprise a printed circuit board including a trace in a loop.

20. The printer as recited in claim 19, wherein the electrical contacts are mounted to a printed circuit board and are coupled to the antenna loop with a coaxial cable.

* * * * *